US006171042B1

(12) United States Patent
Olvera et al.

(10) Patent No.: US 6,171,042 B1
(45) Date of Patent: Jan. 9, 2001

(54) HARDENED STEEL PIN, PIN AND WASHER FASTENER, WASHER FOR FASTENER, AND PIN-MAKING METHOD

(75) Inventors: Gilbert Olvera, Chicago; George M. Velan, Mt. Prospect, both of IL (US)

(73) Assignee: Illinois Tool Works Inc., Glenview, IL (US)

( * ) Notice: Under 35 U.S.C. 154(b), the term of this patent shall be extended for 0 days.

(21) Appl. No.: 08/994,521

(22) Filed: Dec. 19, 1997

(51) Int. Cl.[7] ................................... F16B 15/00
(52) U.S. Cl. .................................... 411/441
(58) Field of Search ........................... 411/440, 441, 411/525, 526, 533, 439

(56) References Cited

U.S. PATENT DOCUMENTS

| Re. 26,518 | 1/1969 | Mau et al. |
| 328,951 | 10/1885 | Lewis |

(List continued on next page.)

FOREIGN PATENT DOCUMENTS

| 1074519 | 7/1960 | (DE) |
| 1181139 * | 11/1964 | (DE) ................................ 411/440 |
| 1345502 | 1/1963 | (FR) |
| 1081475 | 7/1963 | (FR) |
| 1378357 | 11/1963 | (FR) |
| 2374143 * | 7/1978 | (FR) ................................ 411/440 |

Primary Examiner—Flemming Saether
(74) Attorney, Agent, or Firm—Schwartz & Weinrieb

(57) ABSTRACT

As formed from a predetermined length of carbon steel wire, such as AISI C 1062 steel wire or high-manganese carbon steel wire, in sequential forming, rolling, and austempering steps, a pin for axial, non-rotational penetration into a steel, concrete, or masonry substrate has a head, a tapered shank, a point having a tip, and a transition zone between the tapered shank and the head. The head has an outer diameter at least about 2.6 times greater than the initial diameter of the predetermined length wire. The smaller end of the tapered shank has a diameter about 0.6 times the initial diameter thereof. The larger end of the tapered shank has a diameter about 0.7 times the initial diameter thereof. The point is joined unitarily to the smaller end of the tapered shank and conforms exept at the tip, which is rounded, substantially to a tangent ogive, which is tangent to the tapered shank. The transition zone has a tapered portion with a smaller end joined unitarily to the larger end of the tapered shank and with a larger end joined unitarily to the head at a circumferential fillet. The larger end of the tapered portion of the transition zone has a diameter about 1.1 times greater than the initial diameter of the predetermined length wire. The axial length of the transition zone is less than about one half of the axial length of the tapered shank. The austempering step provides the pin with a surface hardness not greater than about Rockwell C 48 and with a core hardness in a range from about Rockwell C 48 to about Rockwell C 58.

20 Claims, 2 Drawing Sheets

U.S. PATENT DOCUMENTS

| | | |
|---|---|---|
| 368,688 | 8/1887 | Rogers . |
| 387,184 | 7/1888 | Rogers . |
| 1,273,441 | 7/1918 | Bardwell . |
| 1,547,162 * | 7/1925 | Bohlman ............................ 411/533 |
| 1,913,143 | 6/1933 | Robertson . |
| 2,165,007 | 7/1939 | Rosenberg . |
| 2,191,771 | 2/1940 | Olson . |
| 2,291,751 | 8/1942 | Oestereicher . |
| 2,342,910 * | 2/1944 | Tinnerman ........................... 411/525 |
| 3,019,677 | 2/1962 | Cermatori . |
| 3,137,195 * | 6/1964 | Rosenberg ........................... 411/441 |
| 3,154,975 | 11/1964 | Chase . |
| 3,196,654 | 7/1965 | Gordon . |
| 3,324,542 | 6/1967 | Hilti . |
| 3,405,547 | 10/1968 | Orlomoski . |
| 3,478,638 | 11/1969 | Thurner . |
| 3,538,739 | 11/1970 | Orlomoski . |
| 3,555,957 | 1/1971 | Hermie et al. . |
| 3,663,977 | 5/1972 | Marcovitch . |
| 3,789,643 | 2/1974 | Dickson . |
| 3,828,604 | 8/1974 | Shelton . |
| 3,921,495 | 11/1975 | Braun et al. . |
| 4,612,501 * | 9/1986 | Costello ............................. 411/525 |
| 4,802,802 | 2/1989 | Thurner . |
| 4,824,003 | 4/1989 | Almeras et al. . |
| 4,881,395 | 11/1989 | Shinjo . |
| 4,915,561 | 4/1990 | Buhri et al. . |
| 4,948,312 | 8/1990 | Jochum . |
| 4,986,709 | 1/1991 | Hachtel et al. . |
| 5,031,305 | 7/1991 | Furrer et al. . |
| 5,054,983 | 10/1991 | Froewis et al. . |
| 5,261,770 | 11/1993 | Hoepker et al. . |
| 5,286,153 | 2/1994 | Sartor et al. . |
| 5,292,216 * | 3/1994 | Van Allman ........................ 411/441 |
| 5,664,922 * | 9/1997 | Janssen ............................... 411/441 |
| 5,730,570 * | 3/1998 | Buhofer .............................. 411/441 |

* cited by examiner

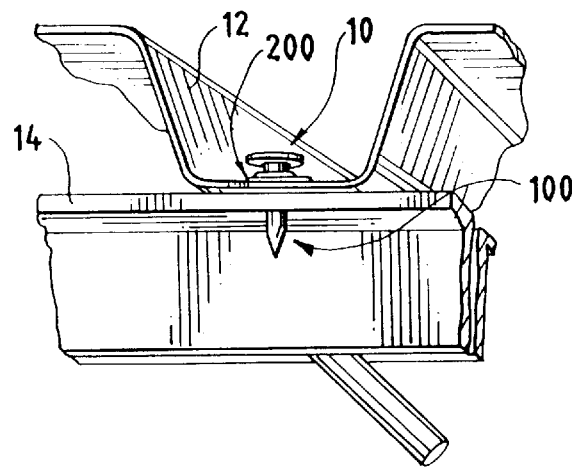
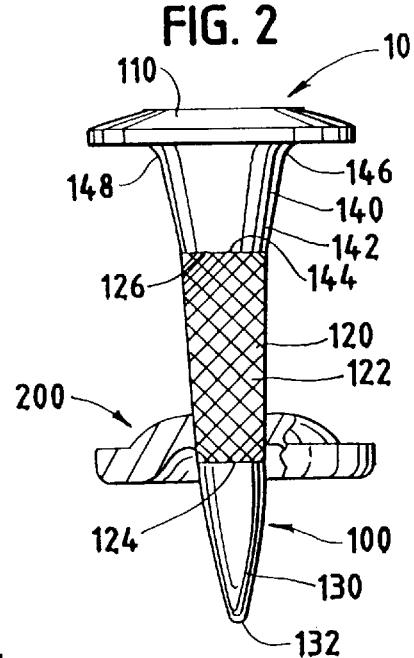
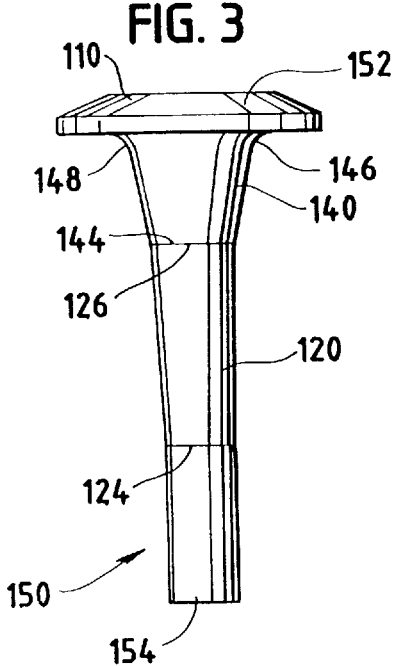
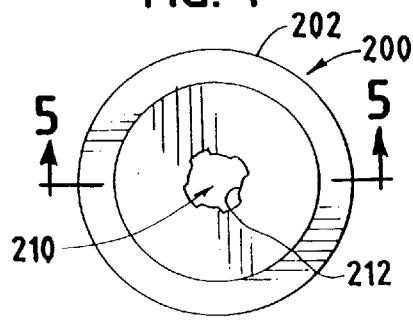
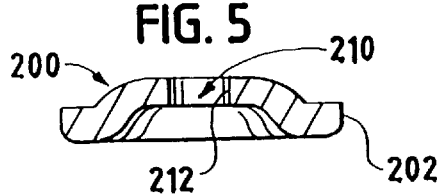
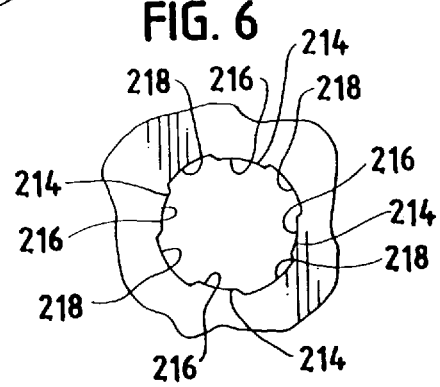

HARDENED STEEL PIN, PIN AND WASHER FASTENER, WASHER FOR FASTENER, AND PIN-MAKING METHOD

TECHNICAL FIELD OF THE INVENTION

This invention pertains to a steel pin for axial, non-rotational penetration into a steel, concrete, or masonry substrate, to a fastener comprising such a pin and a steel washer, and to a steel washer useful in the fastener. This invention also pertains to a method of making such a pin.

BACKGROUND OF THE INVENTION

As exemplified in Almeras et al. U.S. Pat. No. 4,824,003, which issued to Societe de Prospection et d'Inventions Techniques S.P.I.T. of Paris, France, it is known to provide a steel pin, having a head, a shank, and a point, with a steel washer, having an outer diameter equal approximately to the outer diameter of the head, for guiding the steel pin in the muzzle, barrel, or nosepiece of a driving or setting tool. The steel washer is carried on the shank, in axially spaced relation to the head, and is movable toward the head when the pin with the washer is forcibly driven into a substrate, either directly or through a workpiece, so that the washer bears against the substrate or the workpiece. As exemplified therein, the steel washer also performs an energy-absorbing function.

As exemplified by a steel pin made and sold by Societe de Prospection et d'Inventions Techniques S.P.I.T., supra, under Product Designation SBR 14, it is known for the steel pin to have a head, an ogival point, a knurled shank, which is not tapered, and a transition zone having a tapered portion between the knurled shank and the head. The SBR 14 pin is made from carbon steel having a carbon content in a range from 0.58 percent to 0.62 percent.

As known heretofore, the steel pin can be made from a predetermined length of carbon steel wire, which has a carbon content not less than 0.35 percent and which can be surface hardened or through hardened. AISI C 1038 steel, which has a carbon content in a range from 0.35 percent to 0.41 percent, can thus be used. Moreover, the predetermined length of carbon steel wire is formed in an initial step so as to form an intermediate part, which has a head to become the head of the steel pin, a shank to become the shank of the steel pin, and an end portion, on which the point is formed in a further step. As known heretofore, the point is formed by rotary swaging or by so-called "pinch pointing", which refers to forging between two forging dies.

SUMMARY OF THE INVENTION

This invention provides improvements in a steel pin for axial, non-rotational penetration into a steel, concrete, or masonry substrate, in a steel washer useful with the steel pin, in a fastener comprising the steel pin and the steel washer, and in a method of making the steel pin. The fastener is designed to be forcibly driven so that the steel pin is driven into a steel, concrete, or masonry substrate, either directly or through a workpiece.

As improved by this invention, the steel pin is made from a predetermined length of carbon steel wire having an initial diameter and having a carbon content in a range from about the carbon content of AISI C 1038 steel to about the carbon content of AISI C 1065 steel. AISI C 1062 steel wire is preferred for the predetermined length of carbon steel wire. Broadly, the steel pin comprises a head, a tapered shank, a point, and a transition zone.

The head of the steel pin has an outer diameter at least about 2.6 times greater than the initial diameter of the predetermined length of carbon steel wire. Thus, the steel pin differs materially from the prior pin sold under Product Designation SBR 14, in which the head had an outer diameter about 2.3 times the initial diameter of the predetermined length of carbon steel wire used to make the prior pin sold thereunder. Heretofore, it was thought that the maximum diameter of the head of a pin in this carbon range was about 2.3 times the initial diameter, because the pins would be inconsistent due to non-round heads or to cracks caused by over work-hardening.

The tapered shank of the steel pin defines a comparatively smaller conical angle and has a smaller end and a larger end. Its smaller end has a diameter smaller than the initial diameter of the predetermined length of carbon steel wire, preferably being about 0.6 times the initial diameter thereof. Preferably, the larger end of the tapered shank has a diameter about 0.7 times the initial diameter of the predetermined length of carbon steel wire. The tapered shank pin is especially useful in attaching to a bar joist because it develops sufficient holding power by continuously sizing the hole that it forms in the bar joist.

Being joined unitarily to the smaller end of the tapered shank, the point conforms substantially to an ogive, preferably to a tangent ogive, which is tangent to the tapered shank. Although the point conforms substantially to an ogive, the point may have a rounded tip.

The transition zone has a tapered portion defining a comparatively larger conical angle between the tapered shank and the head. The tapered portion of the transition zone has a smaller end joined unitarily to the larger end of the tapered shank. The tapered portion thereof has a larger end joined unitarily to the head.

Preferably, the larger end of the tapered portion of the transition zone has a diameter about 1.1 times the initial diameter of the predetermined length of carbon steel wire. Preferably, the tapered shank defines a conical angle (total taper) in a range from about 2° to about 4°, and the axial length of the transition zone is less than about one half of the axial length of the tapered shank.

As improved by this invention, the steel washer is annular and has an annular periphery and a central aperture, which has a margin with a novel configuration. The margin of the central aperture defines plural projections with pin-engaging surfaces spaced angularly from one another. Each pin-engaging surface conforms essentially to a cylindrical section. Collectively, the pin-engaging surfaces encompass a minor portion of a complete cylinder, not less than about one third of a complete cylinder.

Preferably, the margin of the central aperture of the washer defines exactly four of the pin-engaging surfaces, which are spaced regularly from one another. Preferably, moreover, each pin-engaging surface is configured so as to encompass about one twelfth of a complete cylinder.

The steel washer improved by this invention can be advantageously combined with a steel pin, such as the steel pin improved by this invention, to provide an improved fastener. In the improved fastener, the annular periphery of the washer has an outer diameter equal approximately to the outer diameter of the head and wherein the central aperture of the washer enables the washer to be tightly fitted over the tapered shank, near the smaller end of the tapered shank, when the pin and the washer are assembled. Thus, when the fastener is forcibly driven so that the pin is driven into a steel, concrete, or masonry substrate, the washer and the head are arranged to guide the fastener through the muzzle, barrel, or nosepiece of the driving or setting tool and the washer is arranged to be forcibly moved along the tapered shank, toward the larger end of the tapered shank, as the pin enters the substrate.

As improved by this invention, the method of making a steel pin for axial, non-rotational penetration of a steel, concrete, or masonry substrate, such as the steel pin improved by this invention, contemplates making the steel pin from a predetermined length of carbon steel wire with an initial diameter and with a carbon content in a range from about the carbon content of AISI C 1038 steel to about the carbon content of AISI C 1065 steel, preferably from a predetermined length of AISI C 1062 steel wire, by successive forming, rolling, and heat treating steps.

In the forming step, which may be also called a heading step, the predetermined length of carbon steel wire is formed so as to form an intermediate part, which is elongate and which has a head on one end and a shank between its ends. If the shank is tapered, it is generally tapered in the forming step. In the rolling step, the intermediate part is rolled so as to form a point conforming substantially to a tangent ogive, which is tangent to the shank, whereby a pin is formed. If the shank is knurled, it is knurled in the rolling step. In the heat treating step, the pin is hardened, preferably by austempering so as to provide the pin with a surface hardness of not greater than Rockwell C 52, preferably not greater than Rockwell C 48. The core hardness is preferably between Rockwell C 48 and Rockwell C 58. Optionally, the pin is decarburized in a conventional manner, after the rolling step, before the heat treating step.

BRIEF DESCRIPTION OF THE DRAWINGS

These and other objects, features, and advantages of this invention will be evident from the following description of a preferred mode for carrying out this invention, with reference to the accompanying drawings, in which like reference characters designate like or corresponding parts throughout the several views, and wherein:

FIG. 1, a fragmentary perspective view of a fastener comprising a steel pin and a steel washer and constituting a preferred embodiment of this invention, as used to fasten a steel decking member to a steel bar joist.

FIG. 2, on an enlarged scale, is an elevational view of the steel pin and a cross-sectional view of the steel washer, after the steel pin and the steel washer have been combined to provide the fastener and before the fastener has been driven.

FIG. 3, on a similar scale, is an elevational view of an intermediate part, after a predetermined length of carbon steel wire has been formed to form the intermediate part and before the intermediate part has been rolled to form the steel pin.

FIG. 4, on a similar scale, is a plan view of the steel washer, as seen from above.

FIG. 5, on a similar scale, is a sectional view of the steel washer, as taken along line 5—5 FIG. 4, in a direction indicated by the arrows.

FIG. 6 is a further enlarged, fragmentary detail, as taken from FIG. 4.

DETAILED DESCRIPTION OF THE PREFERRED MODE

Figure 7:
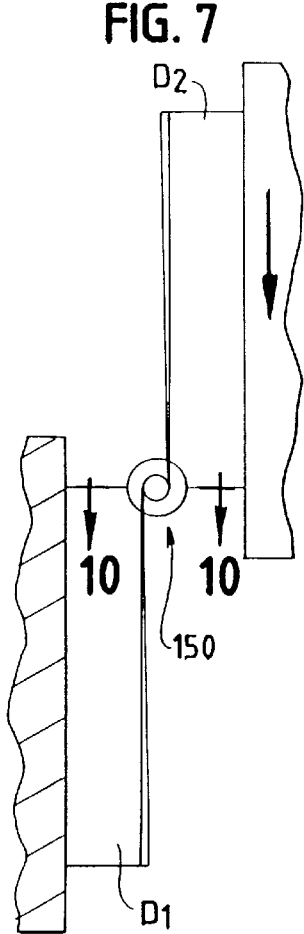
FIGS. 7, 8, and 9 are schematic views of initial, intermediate, and final stages in a rolling process, as seen from below, in which the intermediate part is rolled between two rolling dies to form the steel pin.

As shown in FIG. 1, an improved fastener 10 comprising a steel pin 100 in an improved form to be later described and a steel washer 200 in an improved form to be later described and constituting a preferred embodiment of this invention is useful for fastening a steel decking member 12, which is made from thin sheet steel oftentimes of 18 to 22 gauge, to a steel bar joist 14 of a thickness of 0.125 inch to about 0.1875 inch and a minimum tensile strength of 36,000 psi. Here, the decking member 12 is regarded as a workpiece, and the bar joist 14 is regarded as a substrate. The fastener 10 is shown in FIG. 2, as assembled from the pin 100 and the washer 200, before the fastener 10 is driven.

In a preferred application of this invention, the fastener 10 can be forcibly driven by a fastener-driving tool, such as a powder-actuated tool, as exemplified by the powder-actuated, nosepiece-equipped, fastener-driving tool disclosed in Dewey et al. U.S. Pat. Nos. 5,193,729, 5,199,506, and 5,199,625, the disclosures of which are incorporated herein by reference. If such a tool is used, the fastener 10 is sized to be axially guided in its nosepiece, in a manner to be later described.

In an alternative application of this invention, the fastener 10 can be forcibly driven by a powder-actuated, fastener-driving tool, as exemplified by the powder-actuated, muzzle-equipped, fastener-driving tool disclosed in Almeras et al. U.S. Pat. No. 4,824,003, the disclosure of which is incorporated herein by reference. If such a tool is used, the fastener 10 is sized to enable the fastener 10 to be muzzle-loaded, in a manner disclosed therein.

Broadly, the steel pin 100 comprises a head 110, a shank 120, a point 130, and a transition zone 140 between the shank 120 and the head 110. The washer 200 is carried on the shank 120, in axially spaced relation to the head 110, and is movable toward the head 110 when the fastener 10 is forcibly driven through the decking member 12, into the bar joist 14, so that the washer 200 bears against the decking member 12.

The tapered shank 120 of the steel pin 100 defines a conical angle (total taper), preferably in a range from about 2° to about 4°, and has a knurled surface 122, a smaller end 124, and a larger end 126. The smaller end 124 has a diameter smaller than the initial diameter of the predetermined length of carbon steel wire, preferably being about 0.6 times the initial diameter thereof. The larger end 126 has a diameter about 0.7 times the initial diameter of the predetermined length of carbon steel wire.

Being joined unitarily to the smaller end 124 of the tapered shank 120, the point 130 has a tip 132 and conforms except at the tip 132, which is rounded, substantially to a tangent ogive, which is tangent to the tapered shank 120.

Being between the tapered shank 120 and the head 110, the transition zone 140 has a tapered portion 142 defining a comparatively larger conical angle, preferably a conical angle (total taper) of about 40°. The tapered portion 142 has a smaller end 144 joined unitarily to the larger end 126 of the tapered shank 120. The tapered portion 142 has a larger end 146 joined unitarily to the head 110, by means of a circumferential fillet 148, which is regarded as an integral part of the transition zone 140.

The larger end 146 of the tapered portion of the transition zone 140 has a diameter larger than the initial diameter of the predetermined length of carbon steel wire, preferably about 1.1 times the initial diameter thereof. The axial predetermined length of the transition zone 140, which includes the circumferential fillet 148, is less than about one half of the axial length of the tapered shank 120. It is convenient next to describe the material used to make the steel pin 100.

The steel pin 100 is made from a predetermined length of carbon steel wire, which has a carbon content in a range from about the carbon content of AISI C 1038 steel, which has a carbon content from 0.35 percent to 0.38 percent, to about the carbon content of AISI C 1065 steel, which has a carbon content from 0.60 percent to 0.70 percent. A high-manganese carbon steel having a carbon content in a similar range, such as AISI C 1562 high-manganese carbon steel, can be alternatively used. In a preferred mode for carrying out this invention, a predetermined length of AISI C 1062 steel wire is used, which has an initial diameter of about 0.208 inch.

In an alternative embodiment, such as a pin for fastening to thinner steel, a lower core hardness for the pin may be used, so that a lower carbon wire may be used to create the pin. Also, a more aggressive knurl may be preferred in this application, possibly a knurl with a slight helix.

In a preferred mode for carrying out this invention, the steel pin 100 has novel proportions, which may be conveniently referenced to the initial diameter of the predetermined length of carbon steel wire used to make the pin 100. The head 110 has an outer diameter at least about 2.6 times greater than the initial diameter of the predetermined length of carbon steel wire. The tapered shank 120 has a larger end 126, which has a diameter about 0.7 times the initial diameter of the predetermined length of carbon steel wire, and the larger end 146 of the tapered portion of the transition zone 140 has a diameter about 1.1 times the initial diameter of the predetermined length of carbon steel wire. It is noted that since the larger end 146 of the tapered portion of the transition zone 140 has a diameter which is preferably about 1.1 times the initial diameter of the predetermined length of carbon steel wire, and furthermore, since the head 110 has an outer diameter which is at least 2.6 times greater than the initial diameter of the predetermined length of carbon steel wire, then the outer diameter of the head 110 is approximately 2.36 times greater than the diameter of the larger end 146 of the tapered portion of the transition zone 140.

In an initial step, which is a forming step that may be also called a heading step and which is performed with conventional head-forming equipment for forming heads on pins or screws, the predetermined length of carbon steel wire is formed so as to form an intermediate part 150, which is elongate and has a headed end 152 and an opposite end 154. Suitable head-forming equipment is available commercially from National Machinery Company of Tiffin, Ohio, under Model 56.

As shown in FIG. 3, the intermediate part 150 has the head 110, which is formed on the headed end 152, the shank 120, which is tapered but not yet knurled, the transition zone 140, which is disposed between the head 110 and the shank 120, and the opposite end 154. In a further step to be next described, the point 130 is formed on the opposite end 154, and the tapered shank 120 may be knurled. It is preferred that the tapered shank 120 be knurled.

In the further step, which is a rolling step performed with conventional form-rolling equipment for rolling threads on screws, the intermediate part 150 is rolled between two rolling dies $D_1$, $D_2$, which employ the head 110 as a datum and which are configured suitably. Suitable form-rolling equipment is available commercially from E. W. Menn GmbH Maschinenfabrik of Hilgenbach, Germany, under Model GW 120-H.

Figure 8:
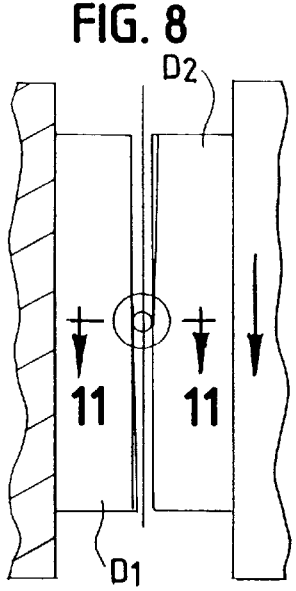
Figure 9:
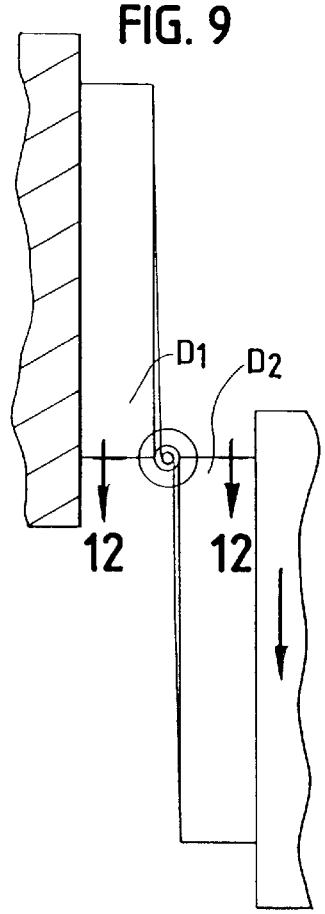
Figure 10:
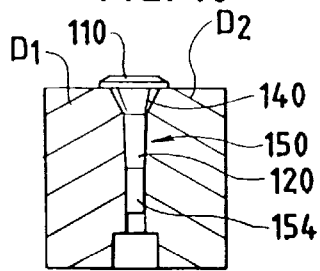
FIGS. 10, 11, and 12 are schematic views of the same stages of the rolling process, as seen from one end of the rolling dies.
Figure 11:
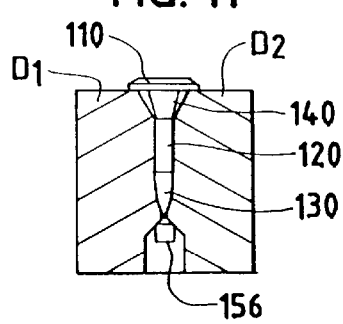
Figure 12:
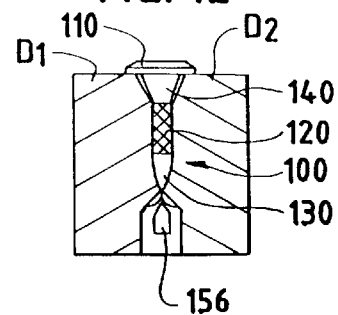

As the rolling dies undergo relative movement from an initial stage shown schematically in FIGS. 7 and 10, through an intermediate stage shown schematically in FIGS. 8 and 11, to a final stage shown schematically in FIGS. 9 and 12, the intermediate part 150 is rolled so as to form the point 130 and so as to knurl the tapered shank 120, if the tapered shank 120 is to be knurled, whereby the pin 100 is formed. As formed in the rolling step, the point 130 has a tip 132 and conforms except at the tip 132, which is rounded, substantially to a tangent ogive, which is tangent to the tapered, knurled shank 120. A fragment 156 of the pointed end 154 is removed at the end of the die travel. It has been found that relatively long dies are preferable so that the movement of material in the pin is slow and the point of the pin is not overheated, and thus over work-hardened, whereby a uniform, smooth surface results, without laps or seams.

In a final step, which is an austempering step performed with conventional heat treating equipment, the pin 100 is austempered so as to have a surface hardness not greater than about Rockwell C 48, or not greater than about Rockwell C 52 if the tapered shank 120 is not knurled, and a core hardness in a range from about Rockwell C 48 to about Rockwell C 58. Suitable heat treating equipment is available commercially from numerous sources. Optionally, the pin 100 is decarburized in a conventional manner, after the rolling step, before the austempering step.

The steel washer 200 is stamped from a sheet of carbon steel, such as AISI C 1038 steel, which is preferred. Being annular, the washer 200 has an annular periphery 202 and a central aperture 210, which has a margin 212 with a novel configuration. The washer 200 is solid between the annular periphery 202 and the margin 212 of the central aperture 210. The margin 212 of the central aperture 210 defines four pin-engaging protrusions 214, which have concave pin-engaging surfaces 216, which are similar to one another, and which are spaced angularly and regularly from one another by four similar recesses 218. Before the washer 200 is fitted onto the pin 100, each pin-engaging surface 216 conforms essentially to a section of an imaginary cylinder of a given diameter. Each recess 218 conforms essentially to a section of an imaginary cylinder of a larger diameter.

Collectively, as contemplated by this invention, the pin-engaging surfaces 216 encompass a minor portion of a complete cylinder. As shown, in the preferred mode for carrying out this invention, each pin-engaging surface 216 encompasses about 30°, which is one twelfth of a complete cylinder. Collectively, in the preferred mode for carrying out this invention, the pin-engaging surfaces 216 encompass about one third of a complete cylinder.

In the improved fastener 10, the annular periphery 202 of the washer 200 has an outer diameter equal approximately to the outer diameter of the head 110 of the pin 100. Further, the central aperture 210 of the washer 200 enables the washer 200 to be tightly fitted over the tapered shank 120 of the pin 100, near the smaller end 124 of the tapered shank 120, when the fastener 10 is assembled. Thus, there is sufficient contact area between the washer 200 and the tapered shank 120 such; that when the fastener 10 is driven by a powder-actuated tool or an equivalent tool and is accelerated, the washer 200 does not move significantly along the tapered shank 120 but stays near the point 130. Being spaced axially, the washer 200 and the head 100 of the pin guide the fastener 10 without permitting the fastener 10 to tumble in the nosepiece of a nosepiece-equipped, fastener-driving tool, as discussed above.

Also, when the fastener 10 is driven, the washer 200 is arranged to be forcibly moved along the tapered shank 120, toward the larger end 126 of the tapered shank 120, when the washer 200 engages a workpiece or a substrate. Because the pin-engaging surfaces 216 of the washer 200 encompass about one third of a complete cylinder, the pin-engaging surfaces 216 limit potential damage to the knurled surface 122 of the tapered shank 120 of the pin 100 when the washer 200 is moved along the tapered shank 120, toward the larger end 126 of the tapered shank 120.

Various modifications may be made in the preferred mode for carrying out this invention without departing from the scope and spirit of this invention.

We claim:

1. A pin, for axial, non-rotational penetration into a steel, concrete, or masonry substrate so as to secure a workpiece to the steel, concrete, or masonry substrate when said pin is driven into the steel, concrete, or masonry substrate by a fastener-driving tool, comprising:
    a tapered shank defining a predetermined conical angle and having a smaller end and a larger end;
    a head joined to said larger end of said tapered shank and having an outer diameter dimension;
    a point joined unitarily to said smaller end of said tapered shank and conforming substantially to an ogive; and
    a transition zone having a tapered portion defining a predetermined conical angle and interposed between said tapered shank and said head such that said transition zone has a smaller end joined unitarily to said larger end of said tapered shank and a larger end joined unitarily to said head, wherein said outer diameter dimension of said head is approximately 2.36 times greater than said larger end of said tapered portion of said transition zone.

2. The pin of claim 1 wherein the point conforms substantially to a tangent ogive, which is tangent to the tapered shank.

3. The pin of claim 1 wherein the tapered shank defines a conical angle in a range from about 2° to about 4° and has an axial length, and wherein the transition zone has an axial length which is less than about one half of the axial length of the tapered shank.

4. The pin of claim 1 wherein the tapered shank is knurled.

5. The pin of claim 4 wherein the point has a rounded tip.

6. The pin as set forth in claim 1, wherein:
    said pin is fabricated from a predetermined length of carbon steel wire which has a carbon content which is within a range from about the carbon content of AISI C 1038 steel to about the carbon content of AISI C 1065 steel, and wherein the surface hardness is not greater than about Rockwell C 52.

7. The pin of claim 6, as formed from a predetermined length of AISI C 1062 steel wire, with a surface hardness not greater than about Rockwell C 48 and with a core hardness in a range from about Rockwell C 48 to about Rockwell C 58.

8. The pin of claim 6, as formed from a length of high-manganese carbon steel wire having a carbon content in the same range.

9. A fastener, for axial, non-rotational penetration into a steel, concrete, or masonry substrate so as to secure a workpiece to the steel, concrete, or masonry substrate when said fastener is driven into the steel, concrete, or masonry substrate by a fastener-driving tool, comprising:
    a pin having a head having an outer diameter; a tapered shank defining a predetermined conical angle and having a smaller end and a larger end; a point joined unitarily to said smaller end of said tapered shank and conforming substantially to an ogive; and a transition zone having a small end joined unitarily to said larger end of said tapered shank and a large end joined unitarily to said head; and
    washer means, mounted upon said tapered shank of said pin at an axial position spaced from said head of said pin and having a predetermined outer diameter which is substantially the same as said predetermined outer diameter of said head, for cooperating with said head of said pin so as to axially guide said pin as said pin is axially driven through the fastener-driving tool and wherein said washer means remains intact for engaging the workpiece after said pin is driven into the steel, concrete, or masonry substrate by the fastener-driving tool so as to secure the workpiece to the steel, concrete, or masonry substrate and maintain the workpiece secured to the steel, concrete, or masonry substrate,
    said washer means comprising an annular periphery and a central aperture, said central aperture having a margin defined by a plurality of concave, pin-engaging surfaces spaced angularly from one another, wherein each pin-engaging surface conforms essentially to a cylindrical section, and wherein further said pin-engaging surfaces collectively encompass less than one-half of a complete cylinder, but not less than about one third of a complete cylinder, so as to limit potential damage to said tapered shank of said pin when said washer means is moved axially along said tapered shank of said pin as said pin is driven into the steel, concrete, or masonry substrate by the fastener-driving tool.

10. The fastener as set forth in claim 9, wherein:
said point of said pin conforms substantially to a tangent ogive which is tangent to said tapered shank.

11. The fastener as set forth in claim 9, wherein:
said tapered shank has a predetermined axial length and defines a conical angle which is within the range of 2–4°; and
said transition zone has a predetermined axial length which is less than approximately one-half said predetermined axial length of said tapered shank.

12. The fastener as set forth in claim 9, wherein:
said tapered shank of said pin is knurled.

13. The fastener as set forth in claim 9, wherein:
said point of said pin is rounded.

14. The fastener as set forth in claim 9, wherein:
said pin is fabricated from a predetermined length of carbon steel wire which has a carbon content which is within a range from approximately the carbon content of AISI C 1038 steel to about the carbon content of AISI C 1065 steel, and wherein the surface hardness is not greater than approximately Rockwell C 52.

15. The fastener as set forth in claim 14, wherein:
said pin is fabricated from a predetermined length of AISI C 1062 carbon steel wire, with a surface hardness not greater than approximately Rockwell C 48 and with a core hardness which is within a range from approximately Rockwell C 48 to approximately Rockwell C 58.

16. The fastener as set forth in claim 14, wherein:
said pin is fabricated from a predetermined length of high-manganese carbon steel wire.

17. The fastener as set forth in claim 9, wherein:
said margin of said central aperture of said washer means defines four pin-engaging surfaces which are equiangularly spaced from each other.

18. The fastener as set forth in claim 17, wherein:

each pin-engaging surface encompasses approximately one-twelfth of a complete cylinder.

19. The fastener as set forth in claim 9, wherein:

said margin of said central aperture further comprises a plurality of arcuate recesses respectively interposed between said plurality of pin-engaging surfaces in a circumferential array around said central aperture of said washer means.

20. The washer as set forth in claim 19, wherein:

said plurality of arcuate recesses collectively define a circular locus which has a diametrical extent which is larger than the diametrical extent of said complete cylinder collectively defined by said plurality of pin-engaging surfaces.

* * * * *